Patented Nov. 20, 1934

1,981,015

UNITED STATES PATENT OFFICE 1,981,015

APPARATUS FOR PRODUCING DIPHENYL

William H. Williams, Midland, Mich., assignor to The Dow Chemical Company, Midland, Mich., a corporation of Michigan Original application February 9, 1931, Serial No. 514,450. Patent No. 1,925,784, dated September 5, 1933. Divided and this application December 23, 1932, Serial No. 648,654

9 Claims. (Cl. 219—36)

This invention concerns an improved apparatus for the production of diphenyl and particularly concerns an electrical heating element to be used in manufacturing diphenyl according to the method set forth in my copending application, Serial No. 514,450, filed February 9, 1931, and issued September 5, 1933, as U. S. Patent No. 1,925,784 of which the present application is a division.

In usual methods of forming diphenyl through heating benzene vapors to a temperature above about 650° C., considerable material is lost due to tar (e. g. higher polyphenyl) formation and the reaction mixture is often carbonized to such extent that the entire apparatus quickly becomes plugged.

I have found that a mixture of diphenyl and benzene is pyrolyzed to form polyphenyls (e. g. triphenyl, etc.) at substantially the same temperatures required to pyrolyze benzene to form diphenyl. In order to avoid excessive polyphenyl formation, then, it is essential that diphenyl be removed from the reaction zone as quickly as possible after being formed. I have further found that the pyrolysis should be carried out at a temperature between approximately 650° and 950° C. Diphenyl is formed but slowly, if at all, at temperatures below 650° C. If the reacting vapors are heated to a temperature appreciably above 950° C. at any point within the reaction zone, excessive tar formation and carbonization occurs.

In order to manufacture diphenyl successfully through pyrolysis of benzene it is, accordingly, essential:—

1. That the pyrolysis be carried out in as short a time as possible so as to avoid excessive tar formation, 2. That following the pyrolysis the reaction mixture quickly be cooled to a temperature below that required to cause pyrolysis, 3. That surfaces in contact with the reacting gases shall not be heated to a temperature appreciably higher than 950° C. at any point within the reaction zone.

As corollaries to the above, it is essential both that the apparatus employed be designed so as to avoid, as nearly as possible, the formation of eddy currents in the gas stream and of local hot spots within the reaction zone. If eddy currents are formed in the gas stream, given portions of the reacting gases may be retained within the reaction zone for a considerable period of time with the result that excessive quantities of tar are liable to be formed. If local hot spots exist within the reaction zone, excessive carbonization of the gaseous reactants nearly always takes place.

During my first attempts to form diphenyl by pyrolyzing benzene, I first passed the benzene vapors at high velocity and in direct-line flow through a tubular metal heating element so as to heat said vapors to a temperature approximating that necessary to cause pyrolysis thereof and then passed the preheated vapors through a continuation of the same tubular metal heating element, whereby the vapors were heated to a higher temperature and were pyrolyzed to form diphenyl. The exit gases were cooled as quickly as possible to a temperature below that at which pyrolysis occurs. The metal heating element employed in carrying out such experiments was heated to an average temperature between 650° and 950° C. by passing an electric current through the same.

Although the experiments described above were carried out under a wide variety of operating conditions with respect to rate of gas flow, composition of the metal heating element (heating elements composed of iron, copper, nichrome, chromium - nickel steel, tungsten - chromium-nickel steel, aluminum coated steel, copper-silicon alloys, etc., were tested) design of apparatus, etc., none of said experiments were sufficiently successful to permit the process to be carried out on a commercial scale. In each of the experiments carbon was deposited to such extent that the apparatus, particularly the metal heating element itself, very quickly became carbonized. The entire apparatus was deformed due to the bulging effect of the carbon which was deposited and the apparatus very frequently became plugged by the carbon deposit after being operated for but a few hours. During each of said experiments a few carbon particles would first be deposited upon the surface of the metal heating element. Such initial carbon deposits changed the electrical conductivity of the heating element at the points of deposition and local hot spots were formed with the result that the rate of carbonization increased rapidly, the metal heating element was soon burned out, and all of the other undesirable effects described above took place.

I have now found that diphenyl may be prepared in excellent yield, that tar formation may be reduced to a minimum, that the heating element employed may be maintained at substantially an even temperature, and that carbonization may substantially be prevented by passing benzene vapors through a reactor constructed in such manner that the benzene vapors are first heated to a temperature approximating that required to cause pyrolysis by being passed over one extended surface of a carbonaceous electrical heating element and are then pyrolyzed by being passed over the reverse extended surface of the same carbonaceous electrical heating element. The gaseous mixture is quickly cooled to a temperature below that at which pyrolysis occurs as it leaves the reaction zone.

Among the various carbonaceous substances of which such electrical heating element may be composed are carbon, graphite, graphitized carbon or any of said materials intermixed with relatively non-conductive materials such as cements or silicon carbide which may be used in making the heating element.

To the accomplishment of the foregoing and related ends the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In the drawings—

Figure 1:
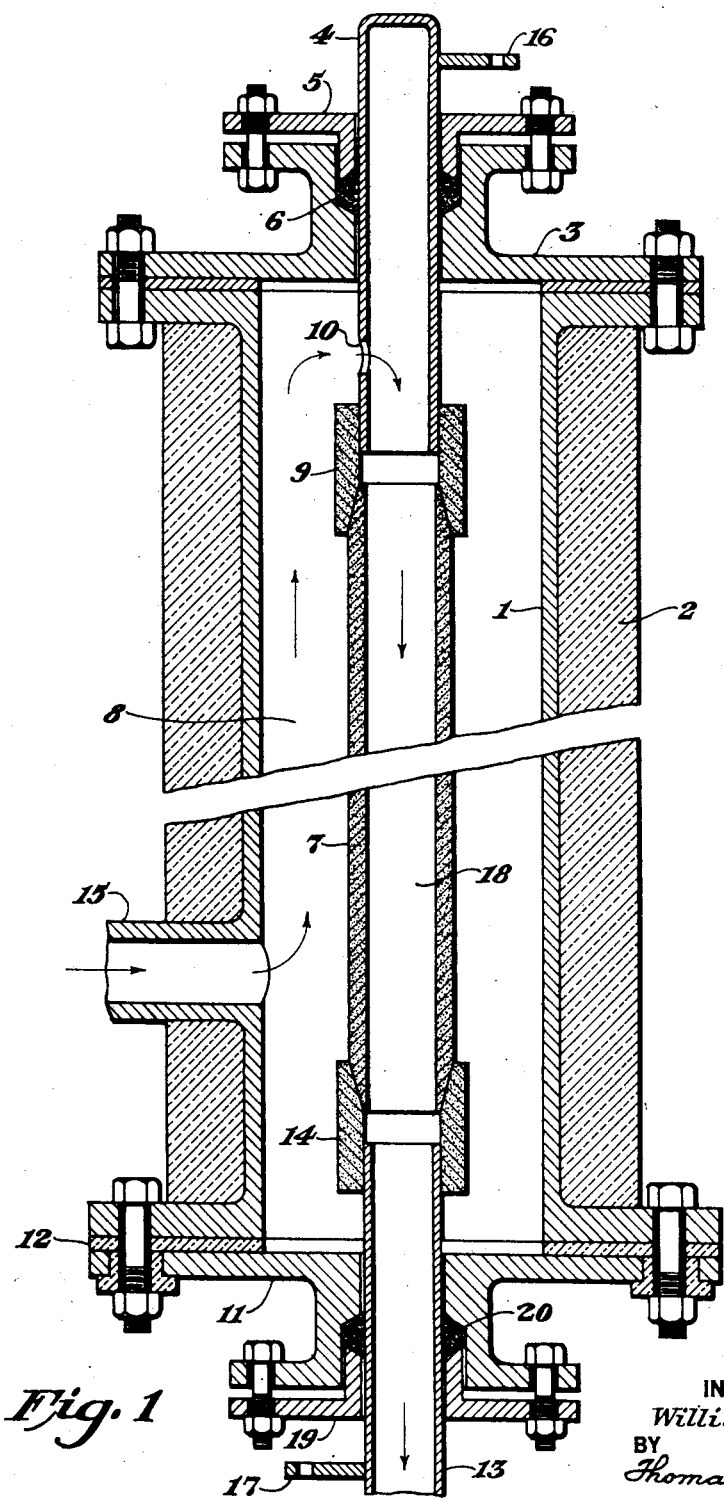
Figure 1 is a vertical section through one form of the invention.

Figure 1 of the annexed drawings represents a vertical tube resistor furnace suitable for converting benzene into diphenyl. The furnace therein illustrated is inclosed by shell 1 having an outer cover of heat insulating material 2. The upper end of shell 1 is flanged and fitted with a cover 3. A removable conduit 4 of chrom-nickel steel, closed at the upper end, is inserted centrally through cover 3, a gas-tight connection being made by means of a suitable packing material 6 capable of withstanding high temperature under pressure of gland 5. The lower end of conduit 4 communicates with a carbon conduit 7 which is preferably tubular and which is centrally disposed within shell 1 and spaced away from the latter to form therewith outer chamber 8 which is usually annular. Conduits 4 and 7 are connected by graphite connector 9. A lateral opening 10 in conduit 4 serves as a vapor inlet from outer chamber 8 to inner chamber 18. The lower end of shell 1 is likewise flanged and closed by a cover 11, and is electrically insulated from the latter by gasket 12, the bolts holding cover 11 being also electrically insulated from cover 11. A conduit 13, preferably tubular, is inserted centrally through cover 11, a gas-tight connection being made by means of gland 19 and packing 20 as described above. The upper end of conduit 13 is connected with the lower end of carbon conduit 7 by means of graphite connector 14. A gas inlet 15 through shell 1 communicates with the lower end of passage 8. Electrical connections are made by lugs 16 and 17 on conduits 4 and 13 respectively.

Figure 2:
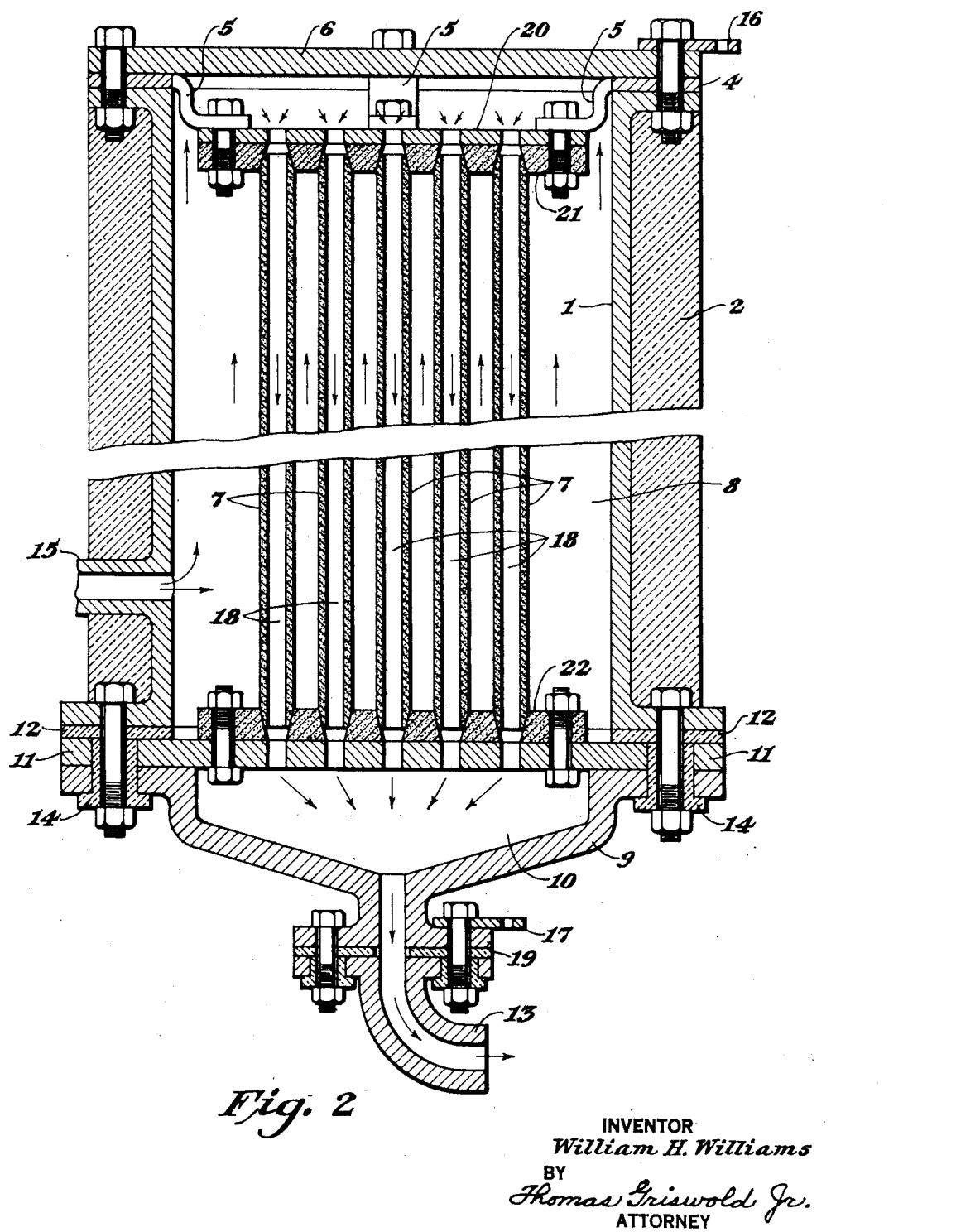
Figure 2 is a vertical section through a multi-tubular modification.

Figure 2 of the annexed drawings represents a vertical multi-tubular electric furnace which may be employed for the production of diphenyl and which operates on the same principle as does the single tubular furnace shown diagrammatically by Fig. 1. The furnace illustrated by Fig. 2 is inclosed by shell 1 having an outer cover of heat insulating material 2. The upper end of shell 1 is flanged, fitted with metal gasket 4, and closed by cover 6. The lower end of shell 1 is flanged and closed by a perforated metal plate 11 and is electrically insulated from the latter by gasket 12. Shell 1, cover 6, and plate 11 inclose outer chamber 8 of the reactor. Located within outer chamber 8 are a plurality of vertical carbon tubes 7 forming inner chambers 18. Tubes 7 extend downwardly into and are supported at their lower extremities by a graphite tube plate 22 which is bolted to the upper surface of metal plate 11, the perforations in the latter serving as vapor outlets from inner chambers 18. The upper extremities of carbon tubes 7 project into a graphite tube plate 21 which is bolted to the lower surface of a perforated metal plate 20, the perforations in the latter serving as vapor inlets from outer chamber 8 to inner chambers 18. Metal arms 5 which extend inwardly from metal gasket 4 and are bolted to the upper surface of plate 20, serve as electrical connections to the latter. A head 9 is bolted to the lower surface of plate 11, a vapor exit passage 10 being formed thereby between head 9 and said plate. The bolts holding shell 1, plate 11, and head 9 in position with respect to each other are electrically insulated from head 9 and plate 11 by insulating material 14. The lower end of head 9 is bolted to outlet tube 13, but is electrically insulated from the latter by insulating material 19. A gas inlet 15 through shell 1 communicates with the lower end of outer chamber 8. Electrical connections to the furnace are made by lugs 16 and 17 on cover 6 and head 9 respectively.

In employing the apparatus shown by Fig. 1 for the production of diphenyl, benzene vapors are led through tube 15 into outer chamber 8 and pass in substantially direct-line flow upwardly through the latter. During flow through outer chamber 8 the vapors are heated almost to a cracking temperature by heat emitted from the carbonaceous heating element 7. The so heated benzene vapors then pass through aperture 10 into inner chamber 18 wherein they pass downwardly through carbonaceous conduit 7 which is heated to a pyrolyzing temperature not exceeding about 950° C. by passage of an electric current therethrough. During passage through inner chamber 18 the benzene vapors are pyrolyzed to form diphenyl and liberate hydrogen. The pyrolyzed vapors pass out of the furnace through exit conduit 13 and as quickly as possible thereafter are cooled to a temperature below about 650° C. Hydrogen, diphenyl, and the higher boiling products are separated from the uncracked benzene and the latter, if desired, is returned to the process.

The multi-tubular furnace shown diagrammatically by Fig. 2 may be operated in a manner similar to that described above.

During pyrolysis of benzene according to the above described method, a relatively small amount of carbonization at first occurs and a hard coating of carbon is deposited upon the carbonaceous heating element. Thereafter, if surfaces in contact with the reacting gases are not heated to a temperature appreciably higher than 950° C., carbonization occurs only to a very slight extent, if at all. The process may, accordingly, be operated continuously over long periods of time.

As an example of operating according to the process herein described, benzene vapors preheated to a temperature of about 550° C. were forced at a rate of 41.3 pounds per hour into a furnace of the type shown by Fig. 1, conduit 7 being a carbon tube 48 inches in length, having an internal diameter of 0.75 inch and having an external diameter of 1.0 inch. The preheated vapors were further heated to a temperature of 750° C. during passage through outer chamber 8 by heat emitted from the outer surface of carbon tube 7, said outer surface being at a temperature of approximately 870° C. The preheated vapors then entered tube 4 and passed downwardly through inner chamber 18 wherein they were heated to about 780° C., by heat emitted from carbon tube 7, the inner surface of said tube 7 being at a temperature of approximately 920° C. The exit vapors, comprising unreacted benzene, diphenyl, higher polyphenyls and hydrogen, were conducted by means of exit pipe 13 into pipe condensers and coolers (not shown) wherein the organic components were condensed by being cooled to 35° C. and the residual hydrogen was vented. By operating in this manner approximately 16 per cent of the benzene employed was pyrolyzed in one pass through the furnace. The crude reaction product contained approximately 83 per cent its weight of diphenyl and 17 per cent of higher polyphenyls.

The employment of a carbonaceous electrical heating element in the manner herein described is advantageous over similar employment of a metal (e. g. iron, iron-chrom alloy, nichrome, etc.) heating element not only because the formation of local hot spots with resultant excessive carbonization may thereby be avoided, but because the relatively low heat conductivity of the carbonaceous heating element renders the problem of accurate temperature control during the pyrolysis relatively simple. In practicing the present invention benzene vapors are heated to substantially a pyrolyzing temperature by being passed over one extended surface of a carbonaceous electrical heating element and are then heated to a still higher temperature and pyrolized by being passed over the reverse extended surface of the same heating element. In order to accomplish such result without danger of overheating the benzene vapors, it is necessary that the surface of the heating element which preheats the benzene vapors be at a temperature lower than the reverse surface of the same heat element which supplies the heat necessary to cause pyrolysis. Due to the fact that carbon and carbonaceous materials are poor heat conductors, heat can be extracted at such rate from a carbonaceous heating element in preheating benzene vapors to substantially a pyrolyzing temperature as to maintain the preheating surface of the heating element at a temperature lower than is the surface of the same heating element which supplies the heat necessary to cause pyrolysis. This property of carbon and carbonaceous materials, then, affords an excellent means of controlling the operating temperatures in the process. Such control is not possible when a metal instead of a carbonaceous heating element is employed according to the present method. Metals are excellent heat conductors and from a practical viewpoint it is not possible to maintain any appreciable temperature difference between the reverse extended surfaces of a tubular electric metal heating element when such metal heating element is employed in the present process.

In the following claims the expression "carbonaceous" shall be understood to refer to any substance composed of carbon, graphite, graphitized carbon, or any of said materials intermixed with relatively non-conductive materials, e. g. cements, or silicon carbide.

Other modes of applying the principle of my invention may be employed instead of those explained change being made as regards the mechanism herein disclosed provided the means stated by any of the following claims or the equivalent of such stated means be employed.

I therefore particularly point out and distinctly claim as my invention:—

1. In an electric furnace for the manufacture of diphenyl, the combination of an outer chamber having a vapor inlet, an inner chamber having walls of carbonaceous material adapted to serve as an electrical heating element, means for passing an electric current through the walls of said inner chamber, a vapor inlet from the outer chamber to said inner chamber located at a point remote from the vapor inlet to the outer chamber and a vapor outlet from said inner chamber.

2. In an electric furnace for the manufacture of diphenyl, the combination of an outer chamber having a vapor inlet, a tubular inner chamber having a wall of carbonaceous material adapted to serve as an electrical heating element, electrical connections to said wall of the inner chamber, a vapor inlet from the outer chamber to the inner chamber located at a point remote from the vapor inlet to the outer chamber and a vapor outlet from said inner chamber.

3. In an electric furnace for the manufacture of diphenyl, the combination of an outer chamber having a vapor inlet, a tubular inner chamber having a carbon wall adapted to serve as an electrical heating element, electrical connections to said wall, a vapor inlet from the outer chamber to the inner chamber located at a point remote from the vapor inlet to the outer chamber and a vapor outlet from said inner chamber.

4. In an electric furnace for the manufacture of diphenyl, the combination of an outer chamber having a vapor inlet, a plurality of inner chambers having walls of carbonaceous material adapted to serve as electrical heating elements, electrical connections to the walls of said inner chambers, vapor inlets from the outer chamber to each of the inner chambers, said inlets being located at points remote from the vapor inlet to the outer chamber, and a vapor outlet from each inner chamber.

5. In an electric furnace for the manufacture of diphenyl, the combination of an outer chamber having a vapor inlet, a plurality of tubular inner chambers having walls of carbonaceous material adapted to serve as electrical heating elements, means for passing an electric current through the carbonaceous walls of the inner chambers, vapor inlets from the outer chamber to each of the inner chambers, said inlets being located at points remote from the vapor inlet to the outer chamber, and a vapor outlet from each inner chamber.

6. In an electric furnace for the manufacture of diphenyl, the combination of an outer chamber having a vapor inlet, a plurality of tubular inner chambers having carbon walls adapted to serve as electrical heating elements, electrical connections to the walls of said inner chambers, vapor inlets from the outer chamber to each of the inner chambers, said inlets being located at points remote from the vapor inlet to the outer chamber, and a vapor outlet from each inner chamber.

7. In an electric furnace for the manufacture of diphenyl, the combination of a carbonaceous electrical heating element shaped in such way as to form walls of an inner chamber of said furnace, electrical connections to the heating element, means for directing a vapor stream first over the outer walls of said heating element and then through the above mentioned inner chamber of the furnace.

8. In an electric furnace for the manufacture of diphenyl, the combination of a carbonaceous tube adapted to serve as an electrical heating element, means for passing an electric current through the carbonaceous tube, means for directing a vapor stream first over the outer surface of said carbonaceous tube and then through the latter.

9. In an electric furnace for the manufacture of diphenyl, the combination of a carbon tube adapted to serve as an electrical heating element, electrical connections to the carbon tube, means for directing a vapor stream first over the outer surface of said carbon tube and then through the latter.

WILLIAM H. WILLIAMS.